Sept. 26, 1961 R. J. SCHULTZ 3,001,387
TORQUE TRANSMITTING SLIP JOINT
Filed June 11, 1958 5 Sheets-Sheet 1
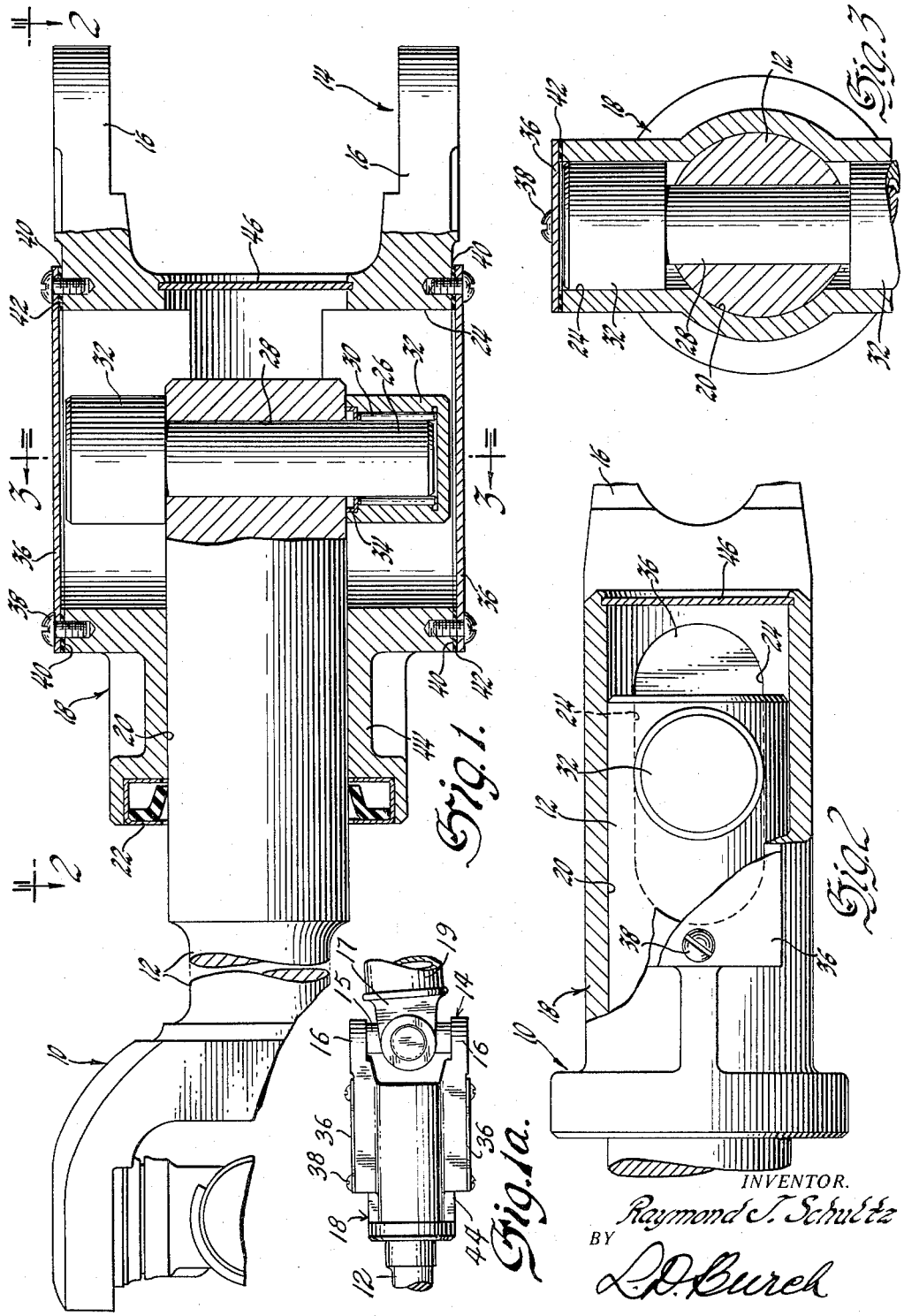
INVENTOR.
Raymond J. Schultz
BY
L. D. Burch
ATTORNEY Sept. 26, 1961 R. J. SCHULTZ 3,001,387
TORQUE TRANSMITTING SLIP JOINT
Filed June 11, 1958 5 Sheets-Sheet 2

INVENTOR.
Raymond J. Schultz
BY
L. D. Burch
ATTORNEY

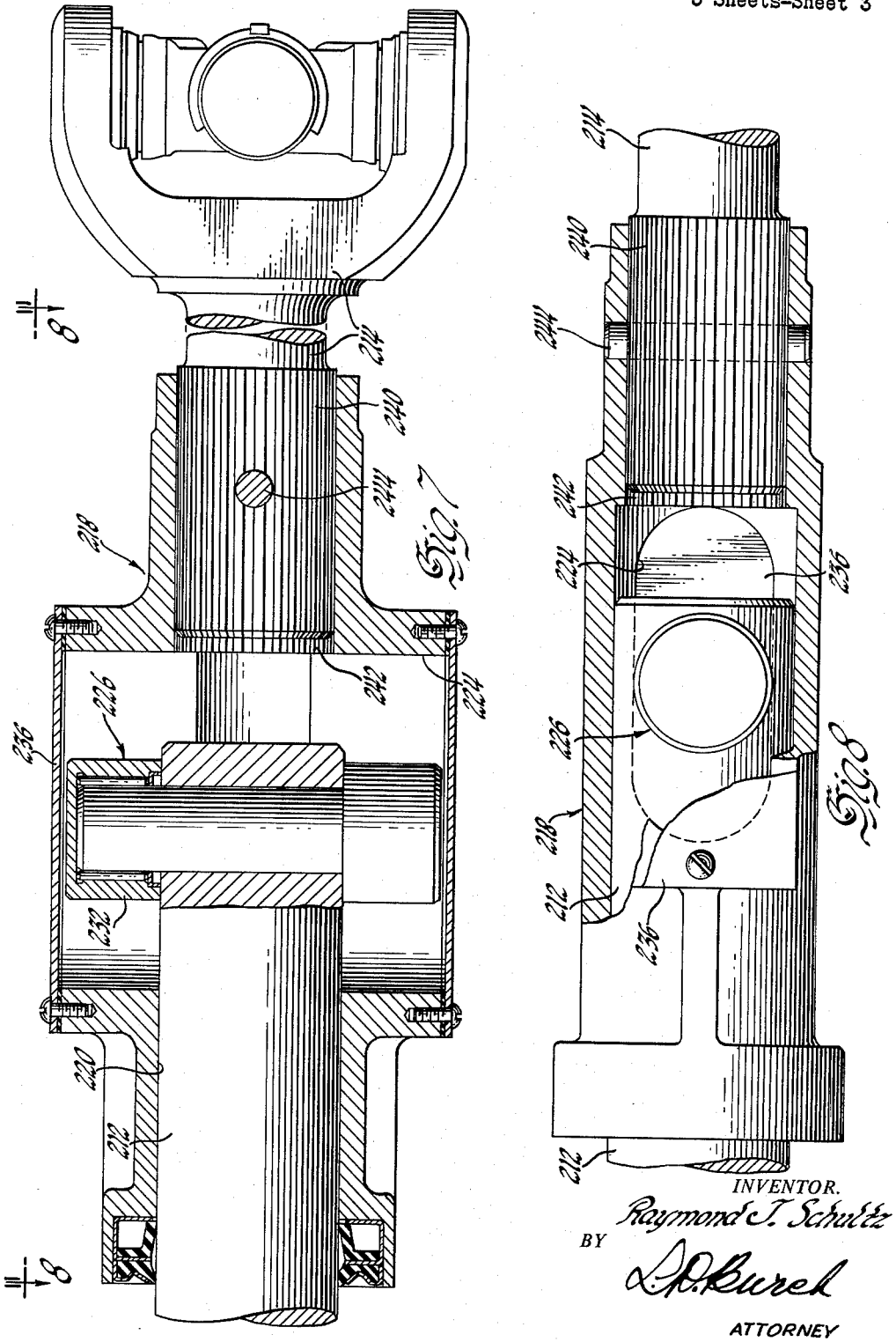

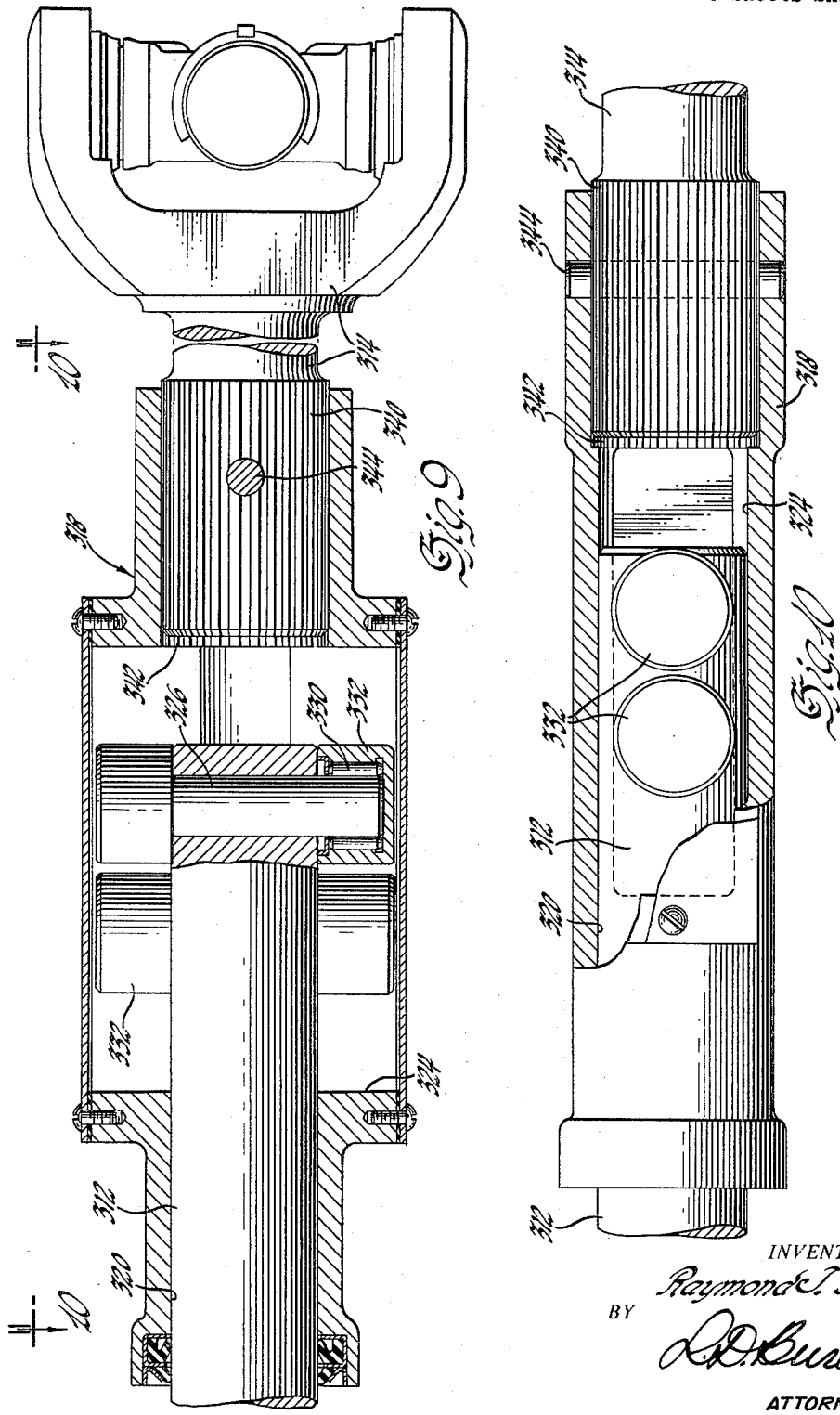

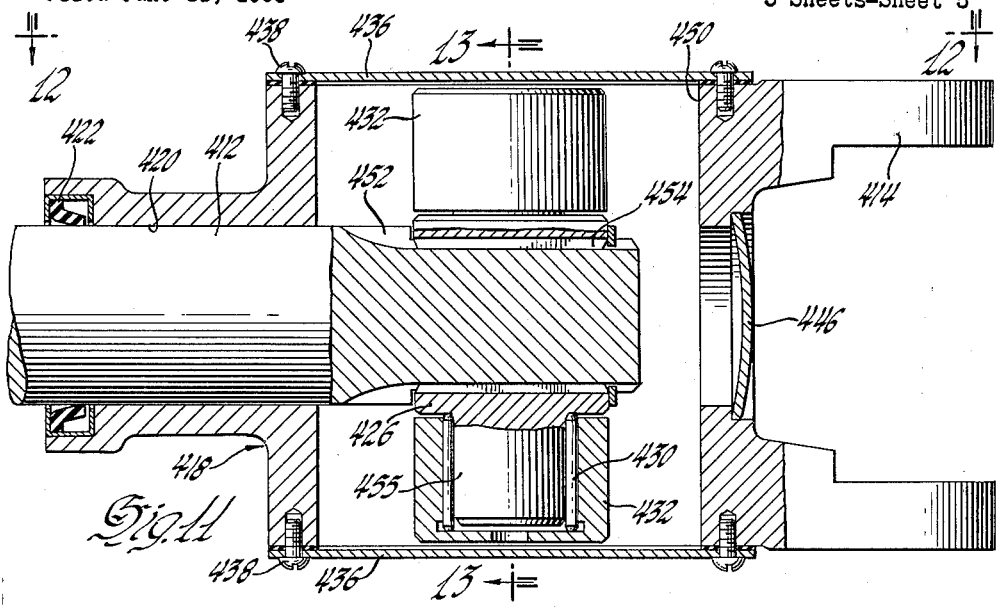
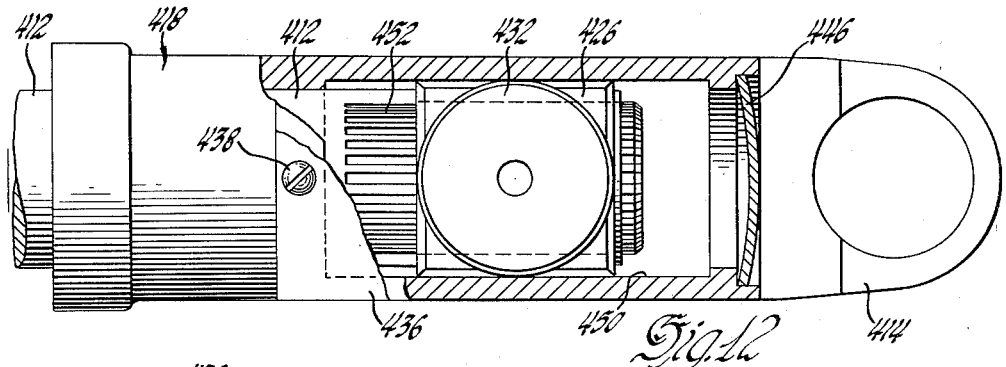
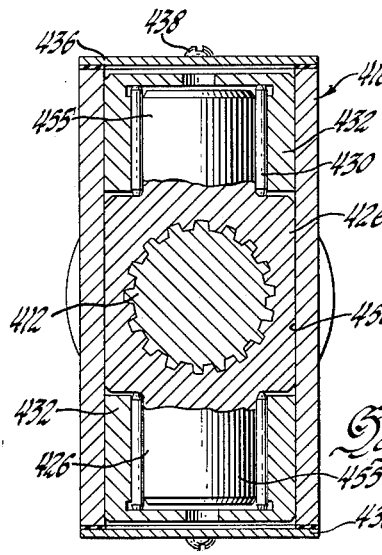

United States Patent Office 3,001,387
Patented Sept. 26, 1961

3,001,387
TORQUE TRANSMITTING SLIP JOINT
Raymond J. Schultz, Bay City, Mich., assignor to General Motors Corporation, Detroit, Mich., a corporation of Delaware
Filed June 11, 1958, Ser. No. 741,416
10 Claims. (Cl. 64—23)

This invention relates to motor vehicle drive lines and more particularly to an axially slipping connection between a drive shaft and a universal coupling.

There has been much difficulty in the past in providing motor vehicle drive lines with drive shafts and universal couplings which provide the required amount of slip necessary for independently sprung rear axles or the like. In present drive line constructions, it is not possible to obtain the required 25 degree angle between the parts without unduly increasing the size of existing structures.

The device in which this invention is embodied comprises a drive shaft section connected to a conventional universal coupling, and pot type slip joint means between the universal coupling and the drive shaft. It is possible, therefore, to get the maximum amount of angularity that conventional universal couplings provide, as well as the required axial slip betweeen the parts, without an oversize or overly bulky structure. Thus, a great decrease in economic, time and labor expenditure is accomplished and a superior motor vehicle drive line is obtained.

In the drawings:

FIGURE 1 shows an elevation view of the drive line embodying the present invention with parts broken away and in section to best illustrate the parts of the structure.

FIGURE 1a is an elevational view of the joints illustrated in FIGURE 1, showing the relationships of the joints to the various drive line sections.

FIGURE 2 is a plan view of the structure of FIGURE 1 taken along the line 2—2 of FIGURE 1, and looking in the direction of the arrows.

FIGURE 3 is a cross sectional view of the joint shown in FIGURE 1 taken substantially along the line 3—3 and looking in the direction of the arrows.

FIGURE 7 is a second modification of the invention with parts broken away and in section to illustrate the parts of the structure.

FIGURE 8 is a plan view of the device shown in FIGURE 7 taken along the line 8—8 and looking in the direction of the arrows.

FIGURE 9 is a third modification of the invention with parts broken away and in section to best illustrate the parts of the structure.

FIGURE 10 is a plan view of the device shown in FIGURE 9 taken along the line 10—10 and looking in the direction of the arrows.

FIGURE 11 shows another modification of the invention with parts broken away and in section to best show the parts of the structure.

FIGURE 12 is a plan view of the device shown in FIGURE 11 taken along the line 12—12 and looking in the direction of the arrows.

FIGURE 13 is a cross sectional view of the joint shown in FIGURE 11 taken substantially along the line 13—13 and looking in the direction of the arrows.

Figure 4:
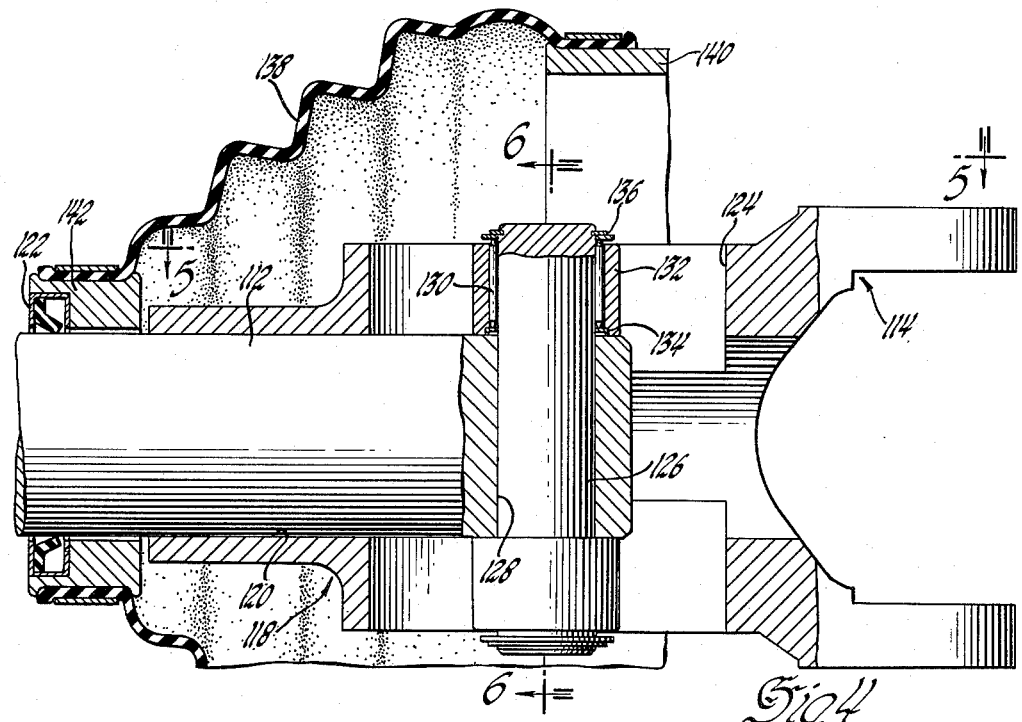
FIGURE 4 is a modification of the invention with parts broken away and in section to illustrate the parts of the structure.
Figure 5:
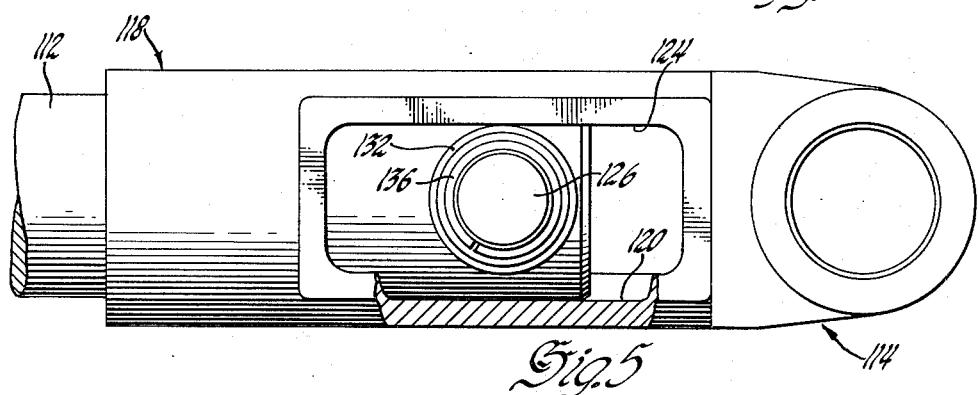
FIGURE 5 is a plan view of the device in FIGURE 4 taken along the line 5—5 and looking in the direction of the arrows.
Figure 6:
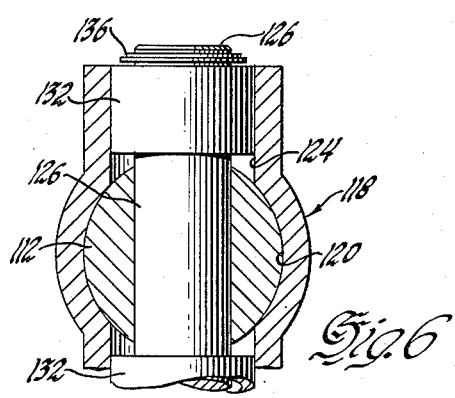
FIGURE 6 is a cross sectional view of the joint shown in FIGURE 4 taken substantially along the line 6—6 and looking in the direction of the arrows.

Referring more particularly to the drawings, FIGURES 1 and 1a best show the basic structure. The motor vehicle drive line has a universal joint member, illustrated generally by the numeral 10, secured to a drive shaft portion 12 and a second universal joint member 14 adjacent the end of the drive shaft member. The universal joint section 14 comprises a pair of conventional bearing spider assembly receiving arms 16, forming the connection for the remainder of the universal joint. The remainder of this universal joint is conventional in structure, including a spider and bearing assembly 15 received in arms 16 and in a second pair of bearing receiving arms 17. A drive shaft member 19 is secured to yoke 17 in any suitable manner, as by welding.

The housing member 18 extends axially from the universal joint member 16 and surrounds the drive shaft portion 12. An axial shaft receiving opening 20 is provided through the housing 18 and is of the same cross section as the drive shaft portion 12. A conventional oil seal assembly 22 surrounds the drive shaft portion 12 to prevent the leakage of lubricant from the housing. A transverse slot 24 is provided through the housing 18 intersecting the drive shaft opening 20 and may be of less width than the shaft receiving opening as desired. However, it is not intended to limit the invention to these dimensions and it is within the scope of the invention to have the slot of equal or greater width than the width of the shaft receiving opening.

A trunnion shaft 26 is received through an opening 28 in the drive shaft member 12, with an annulus of needle bearings 30 disposed about either end. A bearing cap 32 surrounds the trunnion shaft and the annulus of needle bearings to provide relatively frictionless rotation between the bearing cap and the trunnion shaft. The bearing cap, with the washer member 34, serves to locate the needle bearings with respect to the trunnion shaft. The bearing cap 32 is received in the transverse slot 24, formed through the housing 18, and is rotatable therein, the diameter of the bearing cap being the same as the width of the transverse slot, within machining tolerances. Cover plates 36 are secured to the housing 18, as by screw members 38, and are located on machined surfaces 40 on the housing 18. The gasket members 42 prevent oil leakage between the cover plate and the housing member.

The cover plates serve to retain the bearing caps 32 against centrifugal force acting on the bearing caps when the structure is rotated and further provide the centering action for the bearing cap trunnion and drive shaft assembly. The drive shaft, trunnion shaft and bearing cap assembly are movably axially, with respect to the universal joint member 16, the bearing cap being freely rotatable in the transverse slot 24 with a minimum of friction. Angular movement of the drive shaft 12 with respect to the universal member 16 is prevented by the sleeve portion 44 of the housing member, and the shaft receiving opening 20 therethrough.

It is obvious, therefore, that in the manufacture of the housing and universal joint section, a minimum of operations are necessary. If the piece were made from a rough casting, for example, it would be necessary only to broach or bore the shaft receiving opening 20, broach the transverse slot 24, and broach the cover plate receiving surfaces 40. The proper dimensional relations are maintained between the shaft and the universal joint.

Lubricant is retained in the sliding joint by the gasket members 42, by the oil seal 22, and by a closure member 46 secured in the housing 18 at the end of the shaft receiving opening 20.

A modification of the device is shown in FIGURE 4. The drive shaft portion 112 extends into a housing member 118 which may be integrally formed from the universal joint section 114. A shaft receiving opening 120 is formed in the housing 118, and a transverse slot 124 is formed through the housing, intersecting the shaft receiving opening 120. The drive shaft is provided with a trunnion shaft 126, through the bore 128, and an annulus of needle bearings 130 is provided about each end of the trunnion shaft. A bearing retaining sleeve 132 is disposed about the annulus of needle bearings 130, and is freely rotatable in the transverse slot 124. Again, the width of the transverse slot is essentially the same as the diameter of the sleeve, within machining tolerances. The bearing retaining sleeve 132 and needle bearing annulus 130 are retained on the trunnion shaft 126 by a plurality of snap rings 136, which, with the washer members 134, serve to locate the needle bearings with respect to the trunnion shaft. In order to keep lubricant in the joint, a resilient boot member 138 is provided between the conventional drive shaft tube 140 and an annular seal retaining member 142, surrounding the shaft portion 112, and also retaining the oil seal 122.

In the device shown in FIGURE 7, the drive shaft portion 212 extends into the housing 218 and has the trunnion shaft needle bearing and bearing cap assembly, illustrated generally by the numeral 226, extending into the transverse slot 224 in the housing 218. A shaft receiving opening 220 is axially disposed in the housing to receive the drive shaft member 212. Cover plates 236 are again provided, to retain the bearing caps 232 and to center the shaft 212 in the housing.

This modification differs from those previously described in that the housing 218 is not an integral portion of the universal coupling. In this modification, the universal coupling member 214 has an external spline portion 240 at the end adjacent the housing 218, and the housing member 218 has an internally splined bore 242 adapted to engage the spline portion 240 of the universal coupling member. The parts may therefore be assembled or disassembled with ease. In order to prevent axial movement of the parts relative to each other during normal operation of the drive line, a locking pin 244 is provided through the splined connection between the housing 218 and the universal coupling member 214. The joint remains torque transmitting, in that rotation of the drive shaft will be transmitted to the universal coupling, but axial slip is restricted to the housing 218 and the trunnion and bearing assembly 226.

It is not intended to limit the invention to a spline connection between the universal coupling 214 and the housing member 218, and it is conceivable that any type axial joint may be used to connect the parts.

A third modification of the invention is illustrated in FIGURE 9. The drive shaft portion 312 extends into the housing 318 which is axially disposed from the universal joint section 314. A suitable connection, such as a spline connection, is provided between the universal joint section 314 and the housing 318, which might include the externally splined shaft portion 340 and internally splined bore 342 in the housing 318. A locking pin 344 is provided to prevent angular movement between the universal joint section 314 and the housing 318.

In this modification, two trunnion shafts 326 are provided through the drive shaft portion 312, each end of each trunnion shaft having an annulus of needle bearings 330 and a bearing cap 332 mounted thereon.

A transverse slot 324 is provided through the housing 318 and a shaft receiving opening 320 is also provided intersecting the transverse slot. The provision of two trunnion and bearing assemblies serves to decrease the size of the housing necessary to accomplish the desired result.

A fourth modification of the device is illustrated in FIGURES 11 through 13. Referring to FIGURE 11, a drive shaft portion 412 extends into the housing member 418, through a shaft receiving opening 420, and into a chamber 450 in the housing. The housing 418 may be an integral portion of the universal joint yoke section 414, or it may be separately connected as in FIGURES 7 and 9. The end of the drive shaft portion 412 is provided with a plurality of exterior splines 452 and the trunnion member 426 is provided with a bore and a plurality of internal splines 454, receivable about the splined end 452 of the drive shaft portion. A pair of shaft stubs 455 are extended from the trunnion member 426, around each of which is located an annulus of needle bearings 430. The needle bearings are retained in position around the shaft stubs by the bearing cap 432. Cover plates 436, secured to the housing member 418, as by screws 438, retain the bearing caps on the trunnion member against the centrifugal force acting on the bearing caps when the structure is rotated, and further serve to center the trunnion and bearing assembly and drive shaft portion in the chamber 450 of the housing 418.

Lubricant is retained in the sliding joint by the conventional oil seal assembly 422, surrounding the drive shaft section 412, and the cap member 446 in the universal yoke section 414.

The claims:
1. In a motor vehicle, a universal joint having a plurality of parts angularly movable with respect to each other, one of said parts having a housing axially extending therefrom and in a direction away from the other of said parts, said housing having a transverse slot therethrough and an axial shaft receiving bore therein intersecting said transverse slot, a shaft receivable in said bore and having a bearing trunnion extending transversely therethrough, a bearing cap and bearing assembly rotatably mounted on each end of said bearing trunnion and received in said transverse slot to provide relatively low friction axial movement of said shaft in said housing, and means retaining said bearing caps on said trunnion and within said slot against centrifugal force acting on said bearing caps when said universal joint and said housing are rotated.

2. In a motor vehicle drive line having a plurality of shaft members and universal joint means connecting said shaft members, a housing axially extending from one portion of said universal joint means and in a direction away from the remainder of said universal joint means, said housing having an axial opening therein for receiving one of said shaft members, a trunnion and bearing assembly formed on the end of said shaft member and disposed within said housing, and a transverse slot through said housing for receiving said trunnion and bearing assembly and providing relatively low friction axial movement of said shaft member with respect to said universal joint.

3. In a motor vehicle drive line having a pair of drive shaft members and universal joint means connecting said shaft members, a housing axially extending from one portion of said universal joint and in a direction away from the remainder of said universal joint means; said housing being integral with said one portion, said housing having a transverse slot therethrough and a shaft receiving opening therein intersecting said transverse slot, the width of said opening being greater than the width of said transverse slot, a drive shaft member receivable in said shaft receiving opening and extending into said housing, and a trunnion and bearing assembly formed on the end of said shaft member within said housing and extending into said transverse slot for permitting relatively low friction axial movement between said drive shaft member and said universal joint means.

4. In a motor vehicle, a drive shaft; universal joint means adjacent one end of said drive shaft; a housing secured to said universal joint means and axially extending therefrom, said housing having an axial shaft receiving opening therein for slidably receiving said end of said drive shaft, said housing having transverse slot therethrough intersecting said shaft receiving opening; a trunnion and bearing assembly on the end of said drive shaft adjacent said universal joint means and receivable in said tranverse slot, said assembly including a trunnion shaft extending through said drive shaft, an annulus of needle bearings surrounding each end of said trunnion shaft, and a bearing cap around said annulus and said trunnion shaft to retain said annulus in rolling engagement with said trunnion shaft; and cover plates mounted on said housing over each end of said transverse slot to retain said bearing caps on said trunnion shaft against centrifugal force acting on said bearing caps when said universal joint and said drive shaft are rotated.

5. In a motor vehicle having a drive shaft and universal joint means adjacent one end of said drive shaft, a housing spline connected to one portion of said universal joint means for assembly and disassembly purposes, a locking pin through said spline connection to prevent relative axial movement between said housing and said universal joint means during normal operation of said motor vehicle, said housing having an axial drive shaft receiving opening therein and a transverse slot therethrough intersecting said drive shaft receiving opening, and trunnion and bearing means disposed on the end of said drive shaft within said housing and received in said transverse slot for permitting relatively frictionless axial slip between said drive shaft and said housing and universal joint means.

6. In a motor vehicle, a drive shaft; a universal joint adjacent one end of said drive shaft; a trunnion and bearing assembly disposed on the end of said drive shaft adjacent said universal joint; said trunnion and bearing assembly including a trunnion shaft, a bearing cap disposed about one end of said trunnion shaft, and an annulus of needle bearings between said trunnion shaft and said bearing cap to provide frictionless rotation of said bearing cap with respect to said trunnion shaft; a housing integrally formed from the portion of said universal joint adjacent said drive shaft and axially extending therefrom, said housing having a shaft receiving opening therein to receive the end of said drive shaft adjacent said universal joint and a transverse opening therethrough intersecting said shaft receiving opening for receiving said trunnion and bearing assembly to provide relatively frictionless axial movement between said drive shaft and said housing and universal joint; and a cover plate secured to said housing over one end of said transverse slot to retain said bearing cap within said housing against centrifugal force acting on said bearing cap when said housing and universal joint and said drive shaft are rotated.

7. In a motor vehicle, a drive shaft; a universal joint adjacent one end of said drive shaft; a trunnion and bearing assembly disposed on the end of said drive shaft adjacent said universal joint; said trunnion and bearing assembly including a trunnion shaft, a sleeve disposed about one end of said trunnion shaft, and an annulus of needle bearings between said trunnion shaft and said sleeve to provide frictionless rotation of said sleeve with respect to said trunnion shaft; a housing integrally formed from the portion of said universal joint adjacent said drive shaft and axially extending therefrom, said housing having a shaft receiving opening therein to receive the end of said drive shaft adjacent said universal joint and a transverse opening therethrough intersecting said shaft receiving opening for receiving said trunnion and bearing assembly to provide relatively frictionless axial movement between said drive shaft and said housing and universal joint; snap ring means about the end of said trunnion shaft to retain said sleeve within said housing against centrifugal force acting on said sleeve when said housing and universal joint and drive shaft are rotated; and a resilient boot member disposed about said housing and said universal joint to retain lubricant in said housing and said universal joint.

8. In a motor vehicle the combination of a drive shaft, a universal joint adjacent one end of said drive shaft, a trunnion and bearing assembly disposed on the end of said drive shaft adjacent said universal joint, and relatively frictionless sliding joint means between said drive shaft and said universal joint; said universal joint including a plurality of members having relative angular motion therebetween; said trunnion and bearing assembly including a trunnion shaft, a bearing cap disposed about one end of said trunnion shaft and an annulus of needle bearings between said bearing cap and said trunnion shaft to permit frictionless rotation of said bearing cap with respect to said trunnion shaft; and said sliding joint means comprising a housing spline connected to said universal joint means for assembly and disassembly purposes, a locking pin through said connection to prevent axial movement of said housing with respect to said universal joint means during normal operation of said motor vehicle, said housing having a shaft receiving opening axially extending therethrough and a transverse slot intersecting said shaft receiving opening for receiving said drive shaft and said trunnion and bearing assembly and providing relatively frictionless axial movement between said drive shaft and said housing, and a cover plate secured to said housing over one end of said transverse slot to retain said bearing cap within said housing against centrifugal force acting on said bearing cap when said drive shaft and said housing and universal joint means are rotated.

9. In a motor vehicle the combination of a drive shaft, a trunnion and bearing assembly on one end of said drive shaft, a universal joint adjacent one end of said drive shaft, and relatively frictionless sliding joint means between said drive shaft and said universal joint; said universal joint comprising a plurality of members having relative angular motion therebetween; said trunnion and bearing assembly including a pair of trunnion shafts extending through the end of said drive shaft, bearing caps disposed on the ends of each of said trunnion shafts, and an annulus of needle bearings between each bearing cap and the end of said trunnion shaft within each of said bearing caps to provide frictionless rotation of said bearing caps with respect to said trunnion shafts; and said sliding joint means comprising a housing connected to one of said universal joint members, a locking pin through said connection to prevent axial movement of said housing with respect to said universal joint member, said housing having a drive shaft receiving opening therethrough and a transverse slot intersecting said drive shaft receiving opening for receiving said drive shaft and said trunnion and bearing assembly and to provide relatively frictionless axial movement between said drive shaft and said housing, and cover plates secured to said housing at each end of said transverse slot to retain said bearing caps in said housing.

10. In a motor vehicle, a drive shaft, a universal joint adjacent one end of said drive shaft, a trunnion and bearing assembly disposed about the end of said drive shaft adjacent said universal joint, said trunnion and bearing assembly including a trunnion member spline connected to the end of said drive shaft, a bearing cap disposed about the end of said trunnion member, and an annulus of needle bearings disposed between said trunnion member and said bearing cap to provide frictionless rotation of said bearing cap with respect to said trunnion member, a housing formed from the portion of said universal joint adjacent said drive shaft and axially extending therefrom, said housing having a shaft receiving opening therein and a transverse opening therethrough intersecting said shaft receiving opening for receiving said drive shaft and said trunnion and bearing assembly and to provide relatively frictionless axial movement between said drive shaft and said housing and universal joint.

References Cited in the file of this patent

UNITED STATES PATENTS

| | | |
|---|---|---|
| 972,270 | Smith | Oct. 11, 1910 |
| 1,031,222 | Winton | July 2, 1912 |
| 1,153,984 | Watts | Sept. 21, 1915 |
| 1,330,051 | Berardinelli et al. | Feb. 10, 1920 |
| 1,351,292 | Kimble | Aug. 31, 1920 |
| 2,284,198 | Greiner | May 26, 1942 |